(12) United States Patent
Riehle

(10) Patent No.: US 6,409,201 B1
(45) Date of Patent: Jun. 25, 2002

(54) TRAILER COUPLING

(75) Inventor: Hans Riehle, Ludwigsburg (DE)

(73) Assignee: ORIS Fahrzeugteile Hans Riehle GmbH, Moeglingen (DE)

( * ) Notice: Subject to any disclaimer, the term of this patent is extended or adjusted under 35 U.S.C. 154(b) by 0 days.

(21) Appl. No.: 09/598,737

(22) Filed: Jun. 21, 2000

Related U.S. Application Data

(63) Continuation of application No. PCT/EP99/07541, filed on Oct. 7, 1999.

(30) Foreign Application Priority Data

Oct. 21, 1998 (DE) .......................... 198 48 487

(51) Int. Cl.⁷ .............................................. B60D 1/54
(52) U.S. Cl. ................................ 280/491.1; 280/491.3; 280/478.1; 280/511
(58) Field of Search ......................... 280/511, 491.1, 280/491.3, 495, 479.1, 478.1, 504

(56) References Cited

U.S. PATENT DOCUMENTS

| | | | |
|---|---|---|---|
| 2,733,936 A | | 2/1956 | Tate |
| 4,078,827 A | | 3/1978 | Pilhall |
| 4,109,930 A | * | 8/1978 | Pilhall ............... 280/491 B |
| 4,379,569 A | * | 4/1983 | Koch .................. 280/415 |
| 4,923,205 A | * | 5/1990 | Durm ................. 280/491.3 |
| 5,964,475 A | * | 10/1999 | Gentner et al. ......... 280/420 |

FOREIGN PATENT DOCUMENTS

| | | | |
|---|---|---|---|
| DE | 26 19 913 | | 11/1976 |
| DE | 91 09 699 | | 2/1992 |
| DE | 195 21 896 | | 1/1997 |
| DE | 196 12 959 | | 10/1997 |
| DE | 196 51 562 | | 6/1998 |
| EP | 0 288 366 | | 10/1988 |
| FR | 2 227 739 | | 11/1974 |
| FR | 2 450 167 | | 9/1980 |
| FR | 2647394 | * | 11/1990 ............ 280/511 |
| WO | 91 15374 | | 10/1991 |
| WO | 97 10111 | | 3/1997 |
| WO | 97 37862 | | 10/1997 |

* cited by examiner

*Primary Examiner*—Anne Marie Boehler
*Assistant Examiner*—Tony Winner
(74) *Attorney, Agent, or Firm*—Barry R. Lipsitz

(57) ABSTRACT

In order to provide a trailer coupling for motor vehicles, comprising a bearing part arranged fixed to the vehicle and a pivotal part mounted on the bearing part and having a ball neck and a coupling ball, the pivotal part being pivotal in relation to the bearing part about an axis between a rest position and an operative position, in such a way that this trailer coupling may be fixed in the operative position securely and simply, it is proposed that the pivotal part has two abutting elements arranged spaced from one another, that the bearing part is provided with two supporting elements and that, to fix the ball neck in the operative position, one of the supporting elements and one of the abutting elements cooperate such that the ball neck undergoes a pivotal movement in a first direction which is countered by the other of the supporting elements and the other of the abutting elements, and that in so doing the abutting elements and the supporting elements are able to abut against one another without play.

44 Claims, 8 Drawing Sheets

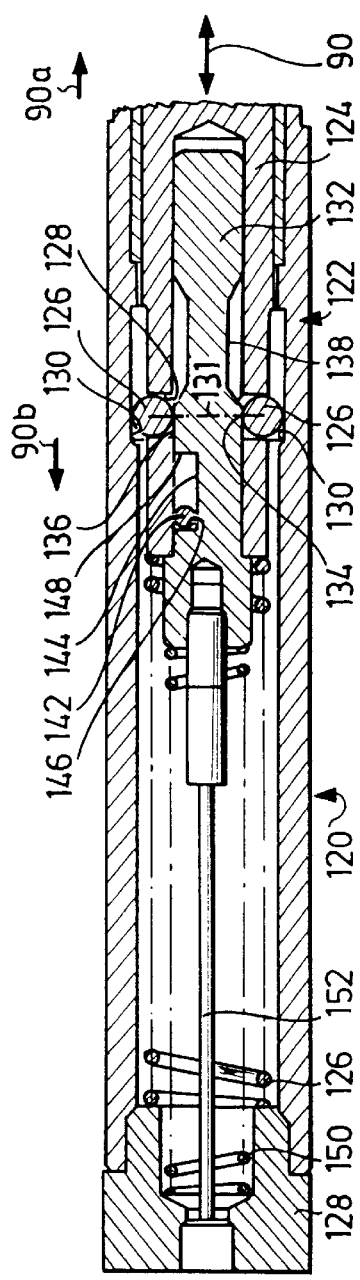
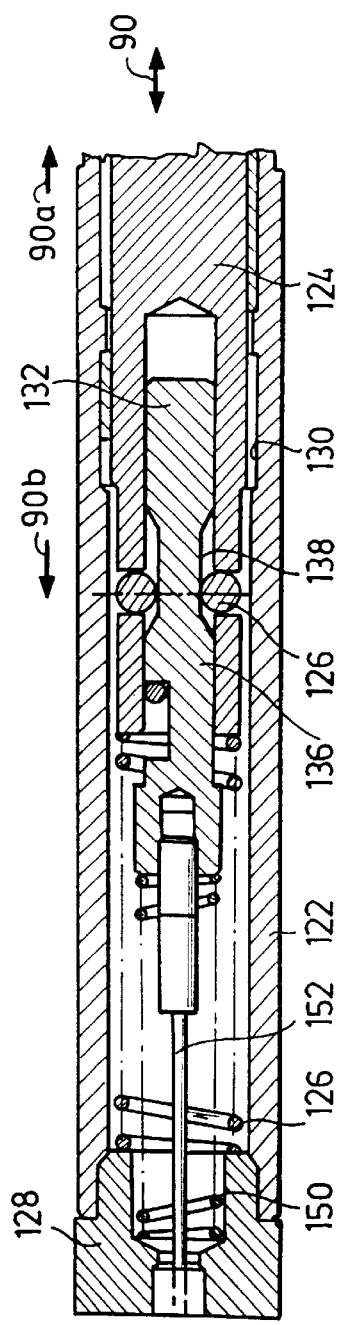
FIG.5  FIG.6  FIG.7

TRAILER COUPLING

This application is a continuation of PCT/EP99/07541 filed Oct. 7, 1999.

The invention relates to a trailer coupling for motor vehicles, comprising a bearing part arranged fixed to the vehicle and a pivotal part mounted on the bearing part and having a ball neck and a coupling ball, the pivotal part being pivotal in relation to the bearing part about an axis between a rest position and an operative position.

A trailer coupling of this type is already disclosed by German patent application 196 12 959.1.

In a trailer coupling of this type, a self-locking gear for driving the pivotal movement is provided and at the same time also allows the ball holder to be fixed in any position. An automatically locking gear of this type is complex structurally, from the point of view of the required safety standards, and thus also from a manufacturing point of view.

The object of the invention is therefore to provide a trailer coupling of the generic type such that it may be fixed in the operative position securely and simply.

This object is achieved with a trailer coupling of the type described at the outset in accordance with the invention in that the pivotal part has two abutting elements arranged spaced from one another, in that the bearing part is provided with two supporting elements and in that, to fix the ball neck in the operative position, one of the supporting elements and one of the abutting elements co-operate such that the ball neck undergoes a pivotal movement in a first direction which is countered by the other of the supporting elements and the other of the abutting elements, and in that in so doing the abutting elements and the supporting elements are able to abut against one another without play.

The advantage of the inventive achievement can be seen in the fact that by providing two co-operating pairs of abutting elements and supporting elements there is the possibility of these abutting against one another without play in pairs and hence achieving fixing of the pivotal part relative to the bearing part which is permanently without play and thus also permanently low in wear, it having been found that, as a result of the abutting against one another without play of the co-operating pairs of one of the abutting elements and one of the supporting elements, it is possible to achieve extremely low wear in the region thereof and thus also in the fixing of the pivotal part.

It is particularly advantageous in this connection if, to fix the ball neck in the operative position, the abutting elements and the supporting elements can be tensioned against one another in a clamping position, the additional tensioning against one another of the pairs of one of the abutting elements and one of the supporting elements providing the possibility of ensuring that there is no play even in the event of material deformation resulting from peak loads occurring, and thus also the possibility of achieving the minimum of wear even when the pivotal part is fixed relative to the bearing part.

It is particularly favourable in this connection if, in the clamping position, one element of a pair comprising one of the supporting elements and one of the abutting elements acts on the other element in the direction in which the clamping force acts, in such a way as to provide an adjustment. The advantage of this way of achieving the object is to be seen in the fact that on the one hand the action of the force makes it possible for the supporting elements and abutting elements to be tensioned against one another and on the other hand the adjustment of at least one element has the effect that, if the other element were to yield because of material resilience when a peak load occurs in the direction of the clamping force action, the one element still maintains the clamping force action on the other element as a result of the former's adjustment, and thus, in the event of a resilient deformation in the region of the pivotal part and the bearing part and/or the pair of the other of the supporting elements and the other of the abutting elements and hence a limited yielding of the other element, the action of the force and the absence of play is still maintained in all supporting elements and abutting elements.

In a particularly favourable manner, the action of the force of one element of a pair comprising one supporting element and one abutting element can be achieved in that in the clamping position a resilient clamping force energy store acts on one of the elements.

This is particularly favourable if the resilient clamping force energy store is constructed as a spring force energy store.

Furthermore, the adjustability of the one element can be achieved in a particularly favourable manner if the latter is mounted movably in the clamping direction.

A movable mounting of this type of one of the elements can be achieved either by a linear mobility thereof or using a linear mobility of the element which is derived from a rotary movement.

No precise details have yet been given regarding the mobility of the abutting elements. Thus, an advantageous example embodiment provides that when the pivotal part is pivoted about the axis each of the abutting elements rotates about the pivot axis on a radially spaced path. This means that it is not necessary to give the abutting elements their own mobility, but rather the abutting elements can be connected directly to the pivotal part and be arranged to be pivotal therewith.

It is particularly favourable in this connection if the abutting elements rotate about the pivot axis on different paths, that is to say if each of the abutting elements has its own path by means of which it rotates about the pivot axis. From a spatial point of view, this means that a particularly simple assignment of the individual abutting elements to the supporting elements corresponding thereto can be achieved.

In principle, it is conceivable to make the abutting elements additionally movable relative to the pivotal part as well, for example in order to achieve the abutting against one another without play of the abutting elements and the supporting elements. However, it is particularly simple from a structural point of view if a first one of the abutting elements is constructed as an element arranged fixed to the pivotal part.

It is even more advantageous if the second of the abutting elements is also constructed as an element arranged fixed to the pivotal part.

In order to achieve the maximum possible lever arm between the axis about which the pivotal part is pivotal and the respective abutting element, that is to say the activation of the force acting on this abutting element, it is preferably provided that one of the abutting elements is arranged on a comb of the pivotal part, this comb having a greater spacing from the pivot axis than for example a bearing body of the pivotal part which surrounds a pivot pin.

In order also to exploit the fact that the ball neck extends away from the pivotal part and thus necessarily extends at an increasing radius from the axis, it is preferably provided that another of the abutting elements is arranged on a lug of the ball neck, this lug adjoining the pivotal part.

Similarly, no further information has yet been given in the explanation of the individual example embodiments regarding the arrangement of the supporting elements themselves. Thus, an advantageous example embodiment provides that a first one of the supporting elements is arranged in a region of the bearing part which is at the rear, as seen in the direction of travel.

Furthermore, in an example embodiment it is preferably provided that a second of the supporting elements is arranged in a region of the bearing part which is at the front, as seen in the direction of travel, while in another example embodiment the second supporting element is also arranged in the rear region of the bearing part.

As regards the mobility of the supporting elements, the greatest variety of ways of achieving the object is conceivable. For example, it is conceivable to move both supporting elements in the direction of the abutting elements, or both abutting elements in the direction of the supporting elements.

A way of achieving the object which is particularly preferred because of its structural simplicity in this connection provides that one of the supporting elements is arranged on the bearing part as a supporting element which at all times projects into the path of the corresponding abutting element and thus for example is acted upon by the abutting element whenever the latter is in the operative position.

In order, however, to have the simultaneous possibility of being able to pivot the ball neck out of the operative position into the rest position and back again, it is preferably provided that another of the supporting elements is arranged on the bearing part as a supporting element which is movable from a release position into the path of the other abutting element as far as a locking position and vice versa.

As regards the mobility of the supporting element from the release position into the locking position, the greatest variety of possibilities is conceivable. One way of achieving the object provides that the movable supporting element is movable into the path of the abutting element as a result of a linear displacement.

Another preferred embodiment provides that the movable supporting element is capable of being pivoted into the path of the corresponding abutting element.

No precise details have yet been given regarding the overall mobility of a supporting element which is movable relative to the path of the corresponding abutting element between a locking position and a release position. Thus, an actuating means is preferably provided for the supporting element, and this serves to provide a bearing for the supporting element for these movements and to act upon it.

One embodiment of an actuating means of this type comprises an adjusting wedge in order to move the supporting element, which is guided movably in a guide, between the locking position and the release position.

Another advantageous way of achieving the object provides that the actuating means comprises a pivot bearing and a pivot drive for the movable supporting element.

No precise details have been given regarding the possibility of causing the supporting surfaces to abut against the corresponding abutting surfaces and to be tensioned against one another in this position, as regards the possibility of implementing such a tensioning with the example embodiments described hitherto. Thus, an advantageous example embodiment provides that a tensioning gear is provided to tension the abutting elements and the supporting elements against one another, by means of which tensioning gear at least one of the supporting elements or at least one of the abutting elements is movable out of a free position into a clamping position and vice versa.

A tensioning gear of this type can be constructed in the greatest variety of ways. For example, the tensioning gear could be constructed such that it can be moved even during the reaction force acting thereon during tensioning of the abutting elements and supporting elements against one another out of the tensioning position, in opposition thereto in the direction of the free position.

However, it is particularly favourable, in particular in order permanently to prevent play from occurring, if the tensioning gear is constructed to be automatically locking, so that the reaction force of the mutually abutting abutting elements and supporting elements cannot result in the tensioning gear moving in the direction of the free position as a result of the action of this force.

A simple possibility for implementing the tensioning gear would be that the tensioning gear is constructed as a wedge gear. A wedge gear represents the simplest way to implement a tensioning gear, in particular if the latter is to be constructed such that it is automatically locking.

In a manner which is particularly simple from a structural point of view, a wedge gear which is constructed as a displacement wedge gear can be implemented.

Another possibility of implementing a tensioning gear is to construct the tensioning gear as an eccentric gear, since an eccentric gear has the advantage that it can be actuated in a simple way by a lever action.

In this connection, the eccentric gear can also be constructed such that it is automatically locking.

No precise details have yet been given regarding the action of the tensioning gear when the abutting elements and supporting elements are tensioned relative to one another. Thus, it is for example conceivable to move both tensioning elements or both supporting elements relative to one another using the tensioning gear, thus towards one another or away from one another using a tensioning gear.

For example, this would also be possible in that a relative movement, made possible by the clamping gear, between the unit comprising the pivotal part and the ball neck and the bearing part is enabled by the tensioning gear.

For example, this could be implemented by constructing the bearing pin of the pivotal part as an eccentric pin and using this eccentric pin to make it possible to tension the abutting elements relative to the supporting elements.

Another way of implementing it would be to move one of the abutting elements relative to the corresponding supporting element.

However, it is particularly favourable, since the supporting elements are arranged on the bearing part, if one of the supporting elements is movable by the tensioning gear in the direction of the corresponding abutting element.

In the case of a wedge gear, in particular a displacement wedge gear, this means that a clamping wedge co-operates with the supporting element in order to move the latter from the free position into the clamping position.

In the case of an eccentric gear, this can be implemented in that the eccentric gear acts on one of the supporting elements and displaces the latter in the direction of the corresponding abutting element.

For example, this could be implemented in that the supporting element, which in any case can be moved into or out of the path of the corresponding abutting element, is also mounted such that it is movable by the eccentric gear.

A solution which is particularly favourable from a structural point of view is one in which the movable supporting element is mounted such that by way of the eccentric gear on the one hand it is displaceable to perform a clamping movement and on the other hand it is pivotal on the eccentric gear in order to pivot into or out of the path of the corresponding abutting element.

An advantageous embodiment provides that the eccentric gear has a pivotally mounted shaft and a pivot bearing for the supporting element which is arranged eccentrically with respect to this shaft, this pivot bearing allowing the supporting element to be pivotal from the locking position into the release position and vice versa.

It is particularly favourable if the actuating means also includes the tensioning gear, so that when the actuating means is operated it is not only possible to move the supporting element between the locking position and the release position but it is also possible to move the latter from the clamping position into the free position and vice versa.

A preferred embodiment of an actuating means of this type provides that in order to fix the pivotal part in the operative position the actuating means moves the movable supporting element from the release position into the locking position, and once the locking position has been reached transfers the tensioning gear from the free position into the clamping position and, in order to release the pivotal part, transfers the tensioning gear from the clamping position into the free position and then moves the supporting element from the locking position into the release position.

Preferably, the actuating means is constructed such that it forcibly moves the movable supporting element from the release position into the locking position and in particular also vice versa.

Furthermore, it is advantageous if the actuating means also forcibly moves the tensioning gear from the free position into the clamping position and in particular also vice versa.

All forcible movements have the advantage that they make it possible to ensure that actuating the actuating means also ultimately results in achieving the desired end position as well.

In particular, a forcible action is also advantageous if it is possible to move from the clamping position to the free position so that it is also possible to overcome jamming of the respective supporting element.

The trailer coupling according to the invention can be actuated particularly easily if the actuating means has a single drive element on actuation of which the movable supporting element can be brought into any of the positions comprising the release position, the locking position, the free position and the clamping position.

One possible way of achieving the object provides that the actuating means has two wedge elements which can successively be brought into a position acting on the supporting element, for example one of the wedge elements serving to transfer the supporting element from the release position into the locking position and the other of the wedge elements serving to transfer the supporting element from the free position into the clamping position.

One alternative to this provides that the actuating means has a ratchet mechanism by means of which it is possible to couple the actuation of the tensioning gear to the pivotal movement of the supporting element between the release position and the locking position.

In order to generate the necessary force to operate the actuating means in order to reach the locking position and the clamping position, preferably a clamping force generating unit which co-operates with the actuating means and acts on the actuating means with a force in such a manner that it is actuated in the direction of the locking position of the supporting element and the clamping position of the tensioning gear is provided.

The advantage of this way of achieving the object is that as a result of the force the actuating means is constantly acted upon in such a way that it has a tendency to move into the locking position and even beyond this into the clamping position, so that the trailer coupling at all times automatically has a tendency to move into a position which securely fixes the ball neck as soon as the latter is in the operative position.

Preferably, in this connection the clamping force generating unit is constructed such that it has a force energy store which acts on the actuating means in order to reach the locking position and the clamping position and which has to be countered in order to reach the free position and the release position.

In order to provide additional security against the trailer device becoming free and in particular against the supporting element being removed from the locking position, it is preferably provided that the clamping force generating unit is provided with a blocking device which, when the latter is not actuated in order to counter the clamping force energy store, blocks leaving of the locking position in the direction of the release position.

Preferably, in this connection the blocking device is constructed such that it has to be freed first before there is any possibility of countering the clamping force energy store.

A particularly advantageous structural way to achieve the object provides that the blocking device can be freed when the clamping force generating unit is actuated in order to reach the release position, and so a movement of this type in the direction of the release position is automatically possible when the clamping force generating unit is actuated.

In order to make operation of the clamping force generating unit as advantageous as possible, it is preferably provided that the clamping force generating unit has an operating element by means of which first the blocking device can be freed and then it becomes possible to act on the actuating means using an unlatching force.

This embodiment of the clamping force generating unit provides the possibility of providing an additional security against freeing the movable supporting element from the locking position.

No precise details have yet been given regarding the arrangement of the actuating means on the bearing part in connection with the explanation hitherto of the individual example embodiments. For example, it is conceivable for the different elements of the actuating means to be borne in different ways, for example on the bearing part.

A particularly favourable solution, however, provides that the actuating means and the movable supporting element form a module which is mountable as a whole on the bearing part.

The fact that a separate module which is to be mounted on the bearing part and is independent thereof is provided also provides the possibility of arranging the actuating means adjustably on the bearing part together with the movable supporting element, so that the possibility is provided of carrying out an adjustment of the actuating means simultaneously with the mounting thereof and therewith carrying out an adjustment of the supporting element held thereby in relation to the supporting element.

Further features and advantages of the invention form the subject of the description below and the illustrations of some example embodiments.

In the drawing:

FIG. 5 shows a longitudinal section through a clamping force generating unit of the first example embodiment, in the non-actuated position;

FIG. 6 shows a cross-section similar to FIG. 5, as actuation of the clamping force generating unit begins;

FIG. 7 shows a section similar to FIG. 5, with the clamping force generating unit fully actuated;

Figure 1:
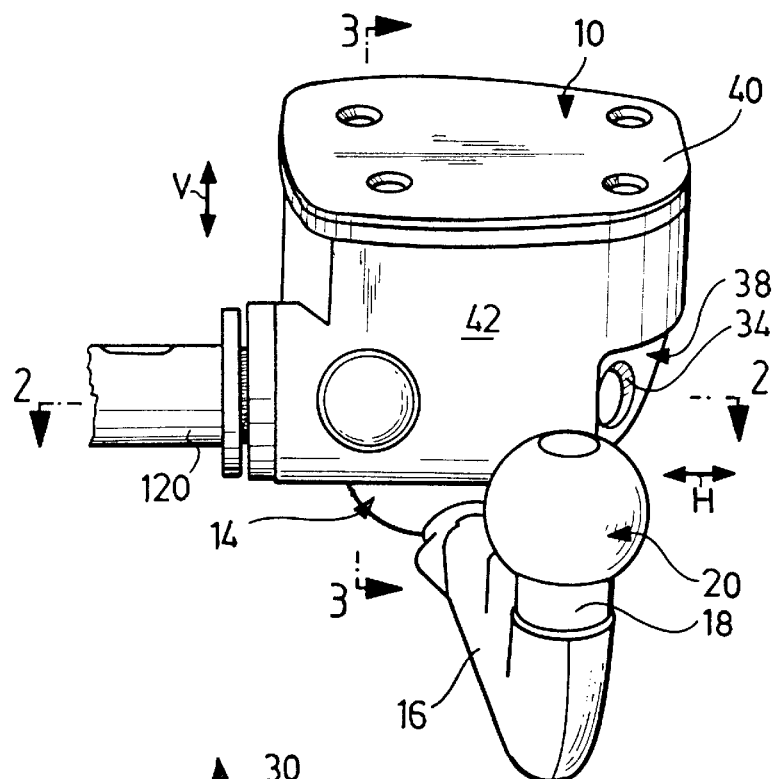
FIG. 1 shows a perspective view of a first example embodiment, from behind.
Figure 2:
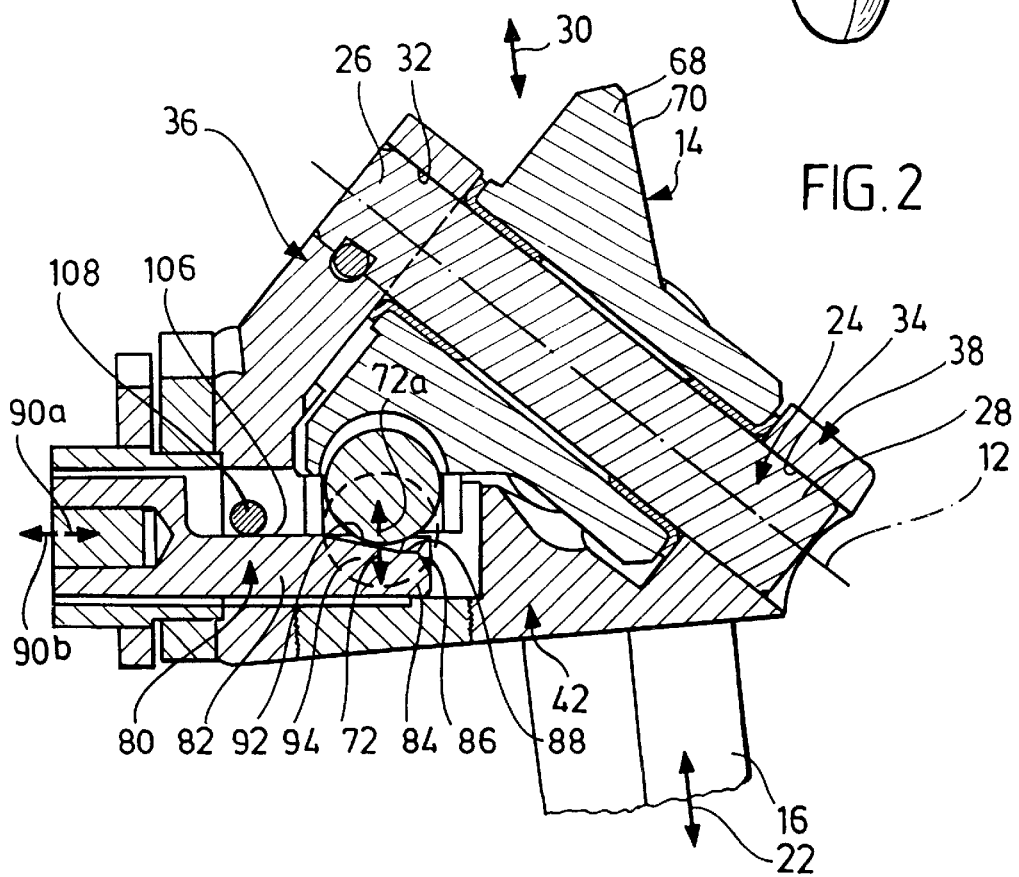
FIG. 2 shows a section along the line 2—2 in FIG. 1.
Figure 3:
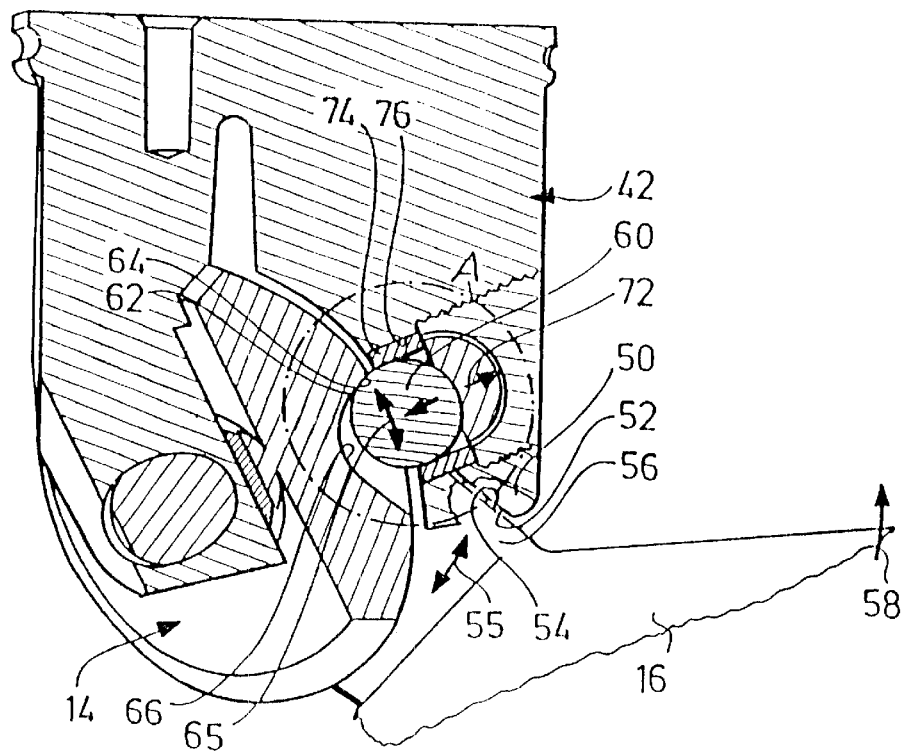
FIG. 3 shows a section along the line 3—3 in FIG. 1.

A first example embodiment of a trailer coupling according to the invention, illustrated in FIGS. 1 to 3, includes a bearing part 10 fixedly mountable to the vehicle, mountable for example to a cross strut which is to be fixedly connected to the vehicle body, and a pivotal part 14 which is pivotal relative to the bearing part 10 about a pivot axis 12 and on which a ball neck 16 is held, this ball neck 16 bearing at its curved end 18 remote from the pivotal part 14 a coupling ball which as a whole is designated 20.

The pivot axis 12 is in this connection an axis inclined both with respect to a vertical line V and with respect to a horizontal line H and a longitudinal direction 30 of the vehicle, for example as described in German patent application 196 12 959.1.

This makes it possible for the ball neck 16 to pivot from an operative position in which the longitudinal direction 22 thereof extends approximately parallel to the longitudinal direction 30 of the motor vehicle into a rest position in which the longitudinal direction 22 is approximately transverse with respect to the longitudinal direction 30 of the vehicle and the coupling ball 20 points downwards towards the road, while in the operative position the coupling ball 20 points upwards in known manner owing to the curved end 18 of the ball neck 16.

To pivotally mount the pivotal part 14 about the pivot axis 12, the former is mounted on a bearing pin 24 which, by means of its mutually opposing ends 26 and 28, engages in bearing bores 32 and 34 in bearing flanges 36 and 38 of the bearing part 10. These bearing flanges 36 and 38 extend downwards from a mounting plate 40 of the bearing part 10, preferably in the direction of the road, and are connected to one another by a rear wall 42 of the bearing part 10 which also extends from the mounting plate 40 in the same direction as the bearing flanges 36 and 38.

Because of the alignment of the pivot axis 12 obliquely with respect to the longitudinal direction 30 of the motor vehicle and obliquely with respect to the vertical line V and the horizontal line H, the bearing flanges 36 and 38 also extend obliquely with respect to the longitudinal direction 30 of the motor vehicle.

To fix the ball neck 16 in the operative position illustrated in FIGS. 1 to 3, a first supporting element 50 is provided on the bearing part 10 in a lower region of the rear wall 42 thereof, and this supporting element 50 has a first supporting surface 52 which faces the ball neck 16 when it is in the operative position and against which a first abutting surface 54 can abut, this abutting surface 54 being arranged on an extension 56 of the ball neck which substantially directly adjoins the pivotal part 14, is constructed as a first abutting element, and in the operative position faces the supporting element 50, this abutting surface 54 also being movable about the pivot axis 12 on a path 55.

The first supporting element 50 and the first abutting element 56 thus delimit a pivotal movement of the ball neck 16 in the manner of a pivotal direction 58 about the pivot axis 12, which corresponds to the pivotal direction 58 of the ball neck 16 from the rest position into the operative position.

A latching ball 60 which is mounted displaceably guided on the bearing part 10 serves as a second supporting element 62 arranged on the bearing part 10 and acts by means of a ball surface 62, as the second supporting surface, on a second abutting surface 64, constructed in a manner similar to the interior surface of a sphere, of a recess 66 arranged in the pivotal part 14 and forming a second abutting element, the recess 66 being arranged in a comb region 68 of the pivotal part 14 which has as large as possible a radial spacing from the pivot axis 12 and is movable about the pivot axis on a path 65 which has a larger radius than the path 55.

Preferably, the pivotal part 14 includes a bearing body 71, surrounding the bearing pin 24, and a frustoconical section extending radially therefrom and forming the comb section 68, the recess 66 being arranged in a conical surface 70 of the frustoconical section.

The second supporting surface 62 in this connection preferably extends obliquely with respect to a direction of movement 72 of the preferably linearly movable second supporting element constructed as a latching ball 60, and abuts against a region, also extending obliquely with respect to the direction of movement, of the ball surface 62 of the latching ball 60, the abutting surface 64 and the supporting surface 62 co-operating such that the pivotal part 14 after a first contact between the abutting surface 64 and the supporting surface 62 and further movement of the latching ball 60 in a clamping direction 72a towards the abutting surface 64 undergoes a moment of rotation about the axis 12 of a type to bring about a movement of the ball neck 14 in the pivotal direction 58 which is prevented in a limited manner by the first supporting element 50 and the first abutting element 56 when the latter abut against one another.

At the moment when the first supporting element 50 and the first abutting element 56 abut against one another and moreover the second supporting element, in other words the latching ball 60, acts on the second abutting element with a clamping force in the clamping direction 72a, a clamping position is reached in which the first supporting surface 52 acts on the first abutting surface 54 and the second supporting surface 62 acts on the second abutting surface with the clamping force in opposition to one another.

All in all, the supporting elements 50 and 60 and the abutting elements 56 and 66 therefore co-operate jointly in such a way that the first supporting surface 52 abuts against the first abutting surface 54 and the second supporting surface 62 abuts against the second abutting surface 64, at all times without play, and keep the ball neck 16 in its operative position without play, a tensioning of the abutting surfaces 54, 64 with respect to the supporting surfaces 52, 62 even being brought about, as explained in detail below.

In order to guide the second supporting element 60, constructed as a latching ball 60, in the direction of its direction of movement 72, a guide bushing 74 which is fixed to the bearing part 10 and is preferably inserted in a recess, provided therefor, in the rear wall 42 is provided.

The latching ball 60 can be moved from a release position shown in dashed lines in FIG. 2 into the locking position shown as a solid line in FIG. 2, by an actuating means, designated 80 as a whole and comprising displacement wedge gear, comprising a wedge body 82, the latching ball 60 in the release position being displaced away from the recess 66 so far that the recess 66 is freely movable on its path 65 predetermined by the pivot axis 12, while the latching ball 60 engages in the recess 66 in the locking position and thus blocks movement of the recess 66 along the path 65.

To displace the latching ball 60 from the release position to the locking position, the wedge body 82 comprises an adjusting wedge 84, arranged on the front side thereof, with an adjusting ramp 86 which serves to move the latching ball 60 out of the release position into a locking position which is already achieved when the latching ball 60 lies on a securing surface 88 which extends parallel to a direction of displacement 90 of the displacing wedge 82, in contrast to the adjusting ramp 86 extending obliquely with respect to the direction of displacement 90. This securing surface 88 is adjoined on an opposite side to the adjusting ramp 86 by a clamping ramp 92 of a clamping wedge 94 of the wedge body 82, which serves to move the latching ball 60 in the direction of clamping 72a out of a free position existing in the locking position, this free position being present when the supporting surface 62 is arranged still with play with respect to the abutting surface 64, in the direction of clamping 72a and at the same time serves to abut the supporting surface 62 against the abutting surface 64 and moreover to continue to act with a great force so that the supporting surface 62 acts with just as great a force against the abutting surface 64 and follows the latter until tensioning of the pivotal part 14 in the operative position of the ball neck 16 is achieved.

The securing surface 88 moreover serves to secure the wedge body 82 against movement in the direction of displacement 90 in which the displacement wedge allows movement out of the clamping position in the direction of the free position because of the shape of the clamping ramp 92 when the latching ball 60 is under great load. If, because of the shape of the clamping ramp 92, the pivotal part 14 acts with great force on the latching ball 60 and thus causes the wedge body 82 to be pushed back in the free direction 90b, in opposition to the direction of clamping 90a, then further pushing back of the displacement wedge 82 is not possible owing to the securing surface 88, since an action on the latter by the latching ball 60 does not result in a further displacement of the wedge body 82 in opposition to the direction of clamping, because its course extends parallel to the direction of displacement 90. This has the result that when the latching ball 60 lies on the securing surface 88, the wedge body 82 keeps the latching ball 60 still in a locking position in which the ability of the pivotal part 14 to rotate freely is prevented by the ball 60, so that the ball neck 16 still cannot leave the operative position, but is merely no longer fixed without play in the operative position 16.

Figure 4:
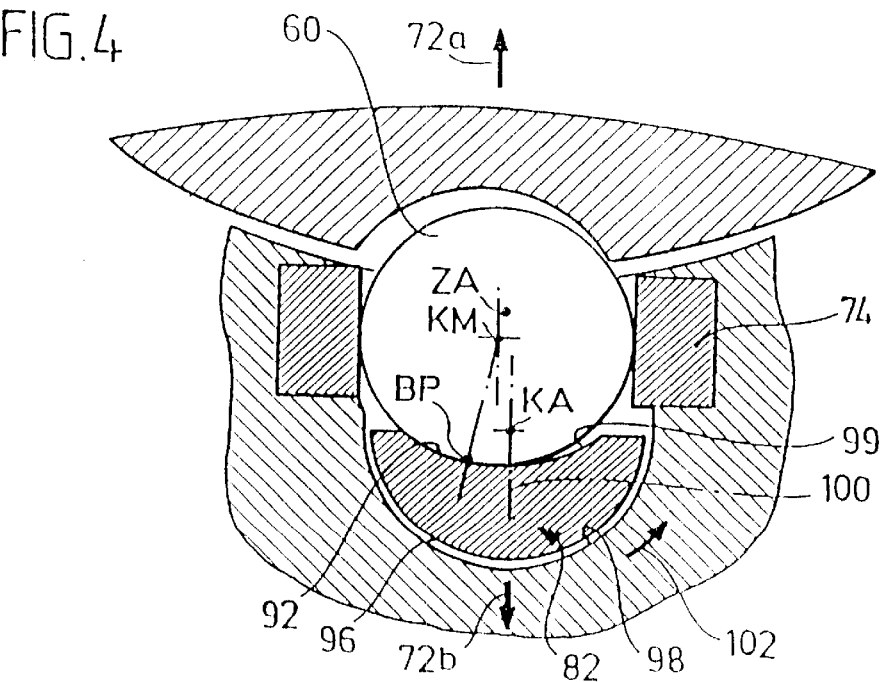
FIG. 4 shows an enlarged section of a detail of the region A in FIG. 3.

In order to prevent the wedge body 82 from being easily displaced in opposition to the direction of clamping 90a by the latching ball 60 acting on the clamping ramp 92, preferably, as shown in FIG. 4, the wedge body 82 is provided on its side remote from the clamping ramp 92, the securing surface 88 and the adjusting ramp 86 with a semi-cylindrical abutting surface 96 which lies in a guide surface 98, also constructed to be semi-cylindrical, in the rear wall 42 of the bearing part 10, so that the wedge body 82 has the possibility of rotating about a wedge body axis KA which represents a cylinder axis of the abutting surface 96 and the guide surface 98 and extends parallel to the direction of displacement 90 when the displacement wedge 82 is acted upon asymmetrically with respect to the wedge axis KA.

The clamping ramp 92 is for its part also constructed as a part-cylindrical surface 99 which has a radius larger than the radius of the latching ball 60, a cylinder axis ZA thereof being arranged laterally offset with respect to a centre plane 100 of the displacement wedge 82 extending through the wedge axis KA.

In contrast thereto, the latching ball 60 is guided by the guide bushing 74 in the direction of movement 72 having the ball centre point KM such that the ball centre point KM is even more laterally offset with respect to the centre plane 100 of the displacement wedge 82 than the cylinder axis ZA, so that a point of contact BP between the latching ball 60 and the surface 99 also lies laterally of the centre plane 100. This means that if the latching ball 60 is acted upon in a direction 72b away from the locking position the result is that the wedge body 82 is acted upon through the point of contact BP laterally of the centre plane 100 and thus, because of the shape of the abutting surface 96 and the guide surface 98, the wedge body 82 is urged to rotate about the wedge axis KA in the direction 102.

The wedge body 82 is prevented from rotating, as illustrated in FIG. 2, by a flat side 106 of the wedge body 82 which extends parallel to the direction of displacement 90 of the wedge body 82, is arranged on an opposite side of the clamping ramp 92 to the securing surface 88, and is guided on a rotation-prevention element 108 extending transversely to the direction of displacement 90 over the flat side 106 in the form of a pin extending transversely to the direction of displacement 90, and is thus prevented from rotating.

As a result of acting on the wedge body 82 at the point of contact BP and as a result of the consequently effected tendency of the wedge body 82 to rotate in the direction 102, the flat side 106 no longer abuts against the rotation-prevention element 108 over its width, transversely to the direction of displacement 90, but only on one side, as a result of which the wedge body 82 wedges against the rotation-prevention element 108 in a manner increasing friction, so that this increased friction makes it more difficult for the wedge body 82 to slide back in opposition to the direction of clamping 90*a*, that is to say in the direction 90*b*.

To actuate the wedge body 82 and to produce the clamping force acting on the wedge body 82 in the direction of clamping 90*a*, by its a clamping force generating unit 120 illustrated in FIGS. 5 to 7 is provided.

The clamping force generating unit 120 includes a housing 122, preferably constructed as a housing tube, in which a clamping body 124 is mounted displaceably in the direction 90.

The clamping body 124 is in this connection acted upon by a clamping spring 126 which is supported against a housing lid 128 which closes the housing 122 on an opposite side to the clamping body 124.

To additionally secure movement of the clamping body 124 in a direction opposed to the direction of clamping 90*a*, the latter is provided with a set of locking bodies 127 which are guided in transverse bores 128 in the clamping body 124 and are movable therein transversely to the direction of displacement 90 of the displacement wedge 82. If the locking bodies 127 are displaced relative to the clamping body 124 to such an extent that they project beyond it in the direction of the housing 122, they can engage in a pocket 130 provided in the housing 122, and as a result of engaging in the pocket 130 they can block movement of the clamping body 124 in opposition to the direction of clamping 90*a*.

In order to keep the locking bodies 127 in this position blocking movement of the clamping body 124, an actuating body 132 is provided in the clamping body 124, and the locking bodies 127 abut against this by means of their inner surfaces 134 remote from the housing 122. The actuating body 132 in this connection has on the one hand actuating surfaces 136 which keep the locking bodies 127 in their blocking position, that is to say their position projecting beyond the clamping body 124 and engaging in the pockets 130, and release surfaces 138 which adjoin the actuating surface 136 and are set so far back in the transverse direction 131 with respect to the actuating surfaces 136 that when the locking bodies 127 abut against the release surface 136 by means of their inner surfaces 134 the locking bodies 127 no longer project beyond the clamping body 124 in the direction of the housing 122 and thus no longer engage in the pockets 130. In this position of the actuating body 132, the clamping body 124 is also freely movable in the direction of displacement 90.

The actuating body 132 is movable to a limited extent relative to the clamping body 124, for example in a manner defined by an abutting pin 142 which engages in a recess 144 in the actuating body 132 extending in the direction of displacement 90, and allows a capacity for displacement of the actuating body 132 relative to the clamping body 124 which is defined by the extent of the recess 144 between these delimiting abutting surfaces 146 and 148.

Furthermore, the actuating body 132 is also acted upon, also in the direction 90*a*, by an adjusting spring 150 which results in the actuating body 132 at all times having a tendency to move in the clamping body 124 in the direction 90*a* so far that the actuating surfaces 136 act on the locking bodies 127 and move the latter into their position blocking displacement of the clamping body 124.

If, however, for example a cable pull 152 acts on the actuating body 132 in the direction 90*b*, in other words in opposition to the direction of clamping 90*a*, then the actuating body 132 moves, as illustrated in FIG. 6, so far in the direction 90*b* that the locking bodies 127 no longer abut by means of their inner surfaces 134 on the actuating surfaces 136 but against the release surfaces 138 and thus have the possibility of moving in the transverse direction 131 so far away from the housing 122 that they no longer engage in the pockets 130. During this, first the clamping body 124 has not yet moved in the direction 90*b* because of the clamping spring 126, which is stronger than the adjusting spring 150, but is still under the force of the clamping spring 126 and acts on the displacement wedge 92 in order to keep the latter in the position keeping the ball 60 in the locking position without play.

Only once the actuating body 132 has moved so far that the movement is limited by the abutting surface 148 acting against the abutting pin 142 is a displacement of the clamping body 124 performed through the actuating body 132 in the direction 90*b* opposed to the direction of clamping 90*a* and thus in opposition to the action of the force of the clamping spring 126, as illustrated in FIG. 7, so that the locking bodies 127 also move in the free direction 90*b* away from the pockets 130 and it is possible to displace the wedge body 82 connected to the clamping body 124 so far that the latching ball 60 has the possibility of adopting its release position beyond the adjusting ramp 86.

As soon as actuation by the cable pull 152 no longer takes place, first the clamping body 124 moves back in the clamping direction 90*a* and at the same time the actuating body 132 again acts on the locking bodies 127 so that these are urged to engage, when they are congruent with the pockets 130 again in the direction 90*a*, with the latter and in turn block further movement of the clamping body 124 in the direction 90*b*, for which purpose the actuating surfaces 136 again act on the locking bodies 127.

The pockets 130 and the locking bodies 127 are in this connection arranged in relation to one another such that when the locking bodies 127 engage in the pockets 130 the clamping body 124 moves to a maximum extent so far in opposition to the clamping direction 90*a* that the latching ball 60 at all times remains in its locking position. For example, the pockets 130 and the locking bodies 127 engaging therein allow a movement of the wedge body 82 so far that a bearing point of the latching ball 60 can move on the clamping ramp 92 up to the securing surface 88 but no further.

Figure 8:
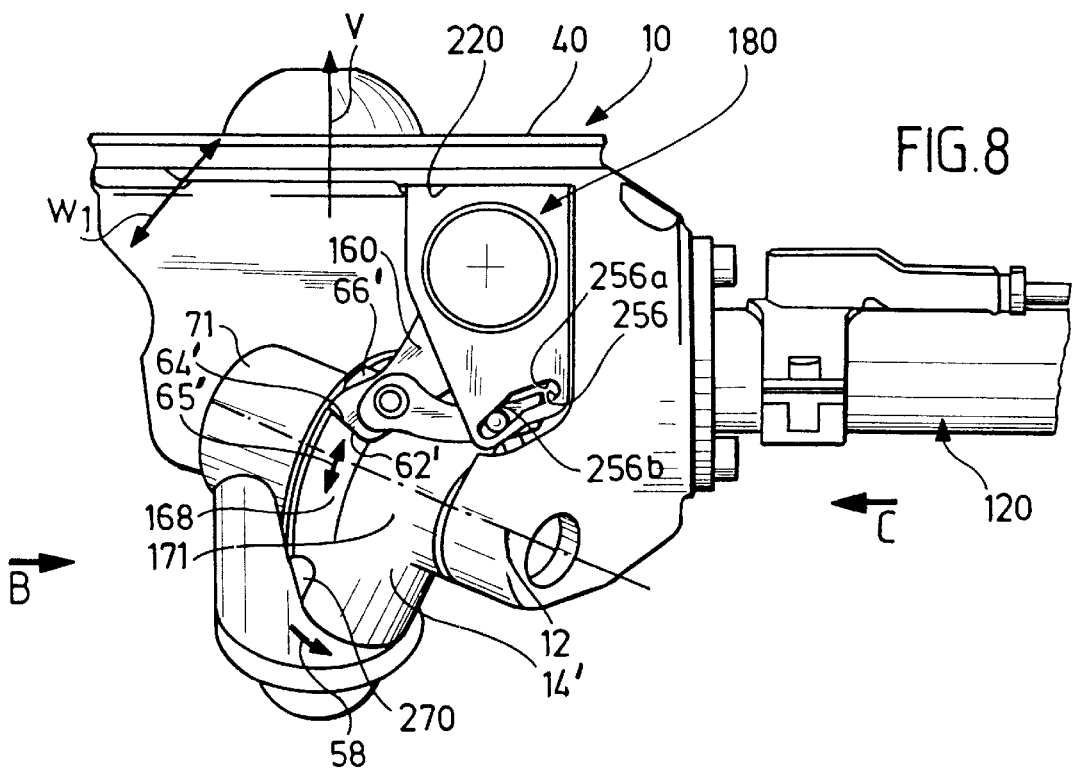
FIG. 8 shows a perspective view of a second example embodiment of a trailer coupling according to the invention, from the front.
Figure 9:
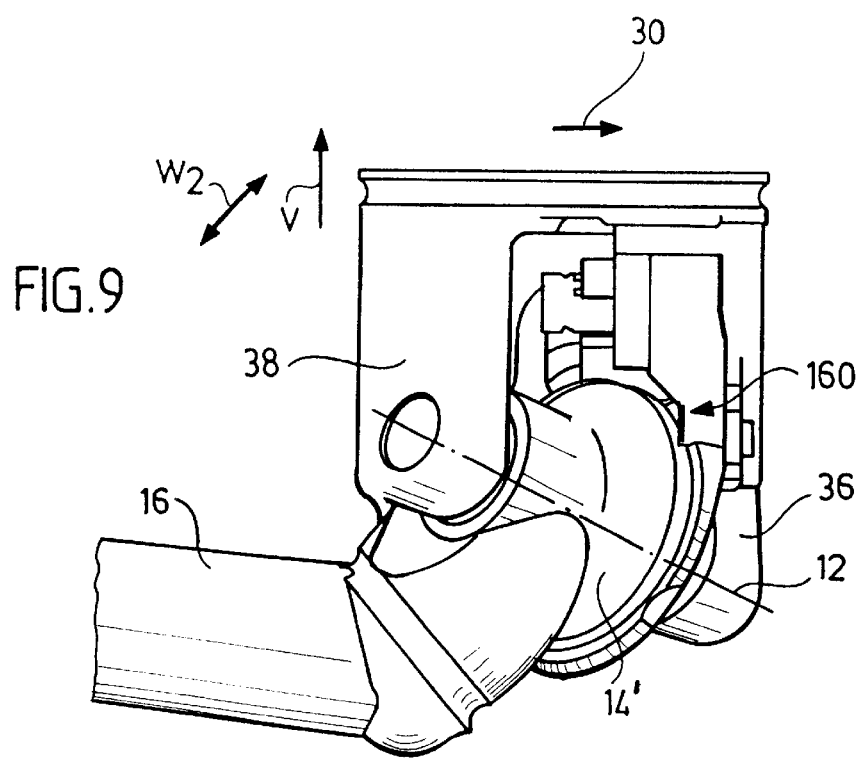
FIG. 9 shows a perspective view of the second example embodiment, in the direction of the arrow B in FIG. 8.

In a second example embodiment of a trailer coupling according to the invention, a detail of which is illustrated in FIGS. 8 and 9, those parts which are identical to those in the first example embodiment are provided with identical reference numerals.

In particular, the bearing part 10 is constructed substantially identically from the point of view of its basic functions, in particular the pivot axis 12 also extending in the same direction as in the first example embodiment. FIG. 8 here shows the angle W1 at which the pivot axis 12 is inclined with respect to the vertical line V when the position of the pivot axis 12 is projected in a transverse plane of the vehicle extending perpendicular to the longitudinal direction 30 of the vehicle. FIG. 9 shows the angle W2 about which the pivot axis 12 is inclined with respect to the vertical line V if the pivot axis 12 is projected in a longitudinal plane of the vehicle drawn from the longitudinal direction 30 of the vehicle and the vertical line V.

Furthermore, the bearing flanges 36 and 38 and the pivotal part 14 and the ball neck 16, exactly as described in the first example embodiment, are connected to one another in one piece and represent a unit pivotal as a whole about the pivot axis 12.

However, the pivotal part 14' differs in respect of its shape from the shape of the pivotal part 14 of the first example embodiment, as explained in detail below.

Figure 10:
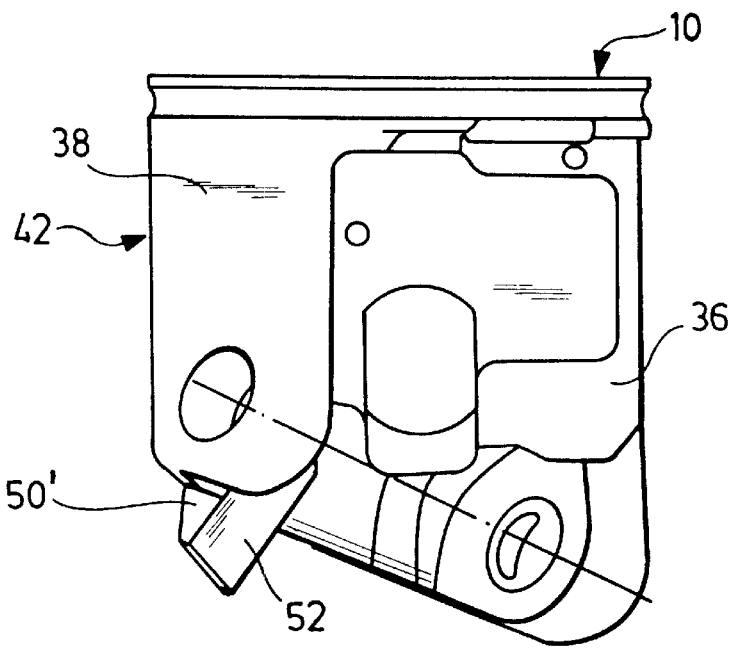
FIG. 10 shows an illustration of a bearing part of the second example embodiment, according to the view in FIG. 9.

In the illustration of the bearing part 10 in FIG. 10, leaving out the pivotal part 14' with the ball neck 16 and the bearing pin 24, the supporting surface 52 provided on the bearing part 10, in particular the rear wall 42 thereof, and formed by a supporting element 50' integrally formed with the rear wall 42 can be seen.

Figure 11:
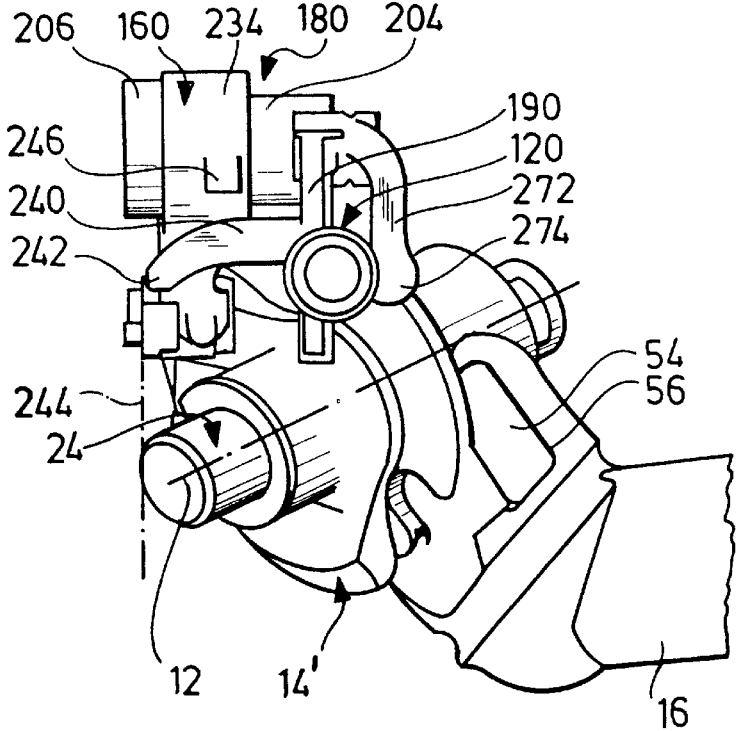
FIG. 11 shows an illustration of the second example embodiment of the trailer coupling according to the invention, without the bearing part, the view being in the direction C in FIG. 1 with the ball neck in the operative position.

As illustrated in FIG. 11, in the operative position the first abutting surface 54 acts against this supporting surface 54 and is borne by the extension 56 to the ball neck 16, which is integrally formed directly on the extension to the ball neck 16 extending from the pivotal part 14'.

As illustrated in FIG. 8, as a second abutting surface 64' an end surface 64', extending transversely to a path of rotation 65' about the pivot axis 12, of a depression designated as a whole 66' is provided, and this is arranged in a comb 168 which rotates about the pivot axis 12 and projects radially beyond a bearing body 171 of the pivotal part 14', this bearing body 171 enclosing the bearing pin 24.

The second supporting surface 62' co-operating with the second abutting surface 64 is borne by a second supporting element 160 constructed in the form of a supporting arm and movable—as explained in detail below—between a locking position illustrated in FIG. 8 and a release position illustrated in FIG. 12.

To pivot the supporting arm 160, an actuating means designated 180 as a whole is provided, and this co-operates with the clamping force generating unit 120 to pivot the supporting arm 160 into the release position and the locking position and to achieve tensioning of the pivotal part 14' therewith.

The clamping force generating unit 120 is in principle of the same construction as in the first example embodiment, with the single difference that it is not the wedge body 82 which is integrally formed on the clamping body 124 as in the first example embodiment, but a recess 186 provided with two mutually opposing active surfaces 182 and 184 and lying therebetween, which with these active surfaces 182 and 184 acts on a sickle-shaped driving lever 190 of the actuating means 180 which engages between these active surfaces 182 and 184.

The driving lever 190 of the actuating means 180 is provided with a lever extension 192 having for example a polygonal shape and inserted in form-fitting manner in a lever receiver 194 of an eccentric shaft 196 (FIG. 3).

The eccentric shaft 196 for its part furthermore includes two bearing surfaces 204 and 206 which are arranged on either side of an eccentric portion 200 and are arranged coaxially with respect to an axis of rotation 202, and which are mounted by bearing surfaces 208 and 210 shaped in accordance with the bearing surfaces 204 and 206 and capable of rotation about the axis of rotation 202 in bearing flanges 212 and 214 of a bearing body designated 216 as a whole, the bearing body 216 including a base plate 218 which bears the bearing flanges 212 and 214 and which for its part, as for example illustrated in FIG. 8, is mountable on an underside 220 of the mounting plate 40.

Preferably, mounting of the base plate 218 is provided in such a way that by positioning of the base plate 218 and also positioning of the whole actuating means 180 and thus adjustment of the actuating means 180 together with the supporting arm 160 relative to the bearing part 10 may be carried out.

The eccentric shaft 200 also includes a bearing surface 230 which is constructed cylindrically with respect to an axis 232 offset eccentrically with respect to the axis of rotation 202.

As a result of the bearing surface 230 the supporting arm 260, together with bearing eye surfaces 236 arranged in a bearing eye 234 of the supporting arm, is mounted to be rotatable about the axis 232, it being possible, by rotating the eccentric portion 200 about the axis of rotation 202, to displace the supporting arm 160 in the radial direction with respect to the axis of rotation 202, with the maximum possible displacement of the supporting arm 160 in the radial direction with respect to the axis of rotation 202 corresponding to the spacing between the axis 232 and the axis of rotation 202.

Moreover, the supporting arm 160 is pivotal independently of the position of the eccentric portion 200 because of the cylindrical construction of the bearing surface 230 about the axis 232, pivoting of the supporting arm 160 also taking place at the same time through the driving lever 190, as described in detail below.

The driving lever 190 is for this purpose, as illustrated in FIG. 11, provided with an entrainer arm 240 which extends transversely with respect to the driving lever 190 in the direction of the supporting arm 160 and then beyond the supporting arm 160 so far away from the driving lever 190 that a front end 242 of the entrainer arm reaches as far as a plane 244 which extends perpendicular to the axis of rotation 202 on a side of the supporting arm 160 remote from the driving lever 190.

Figure 12:
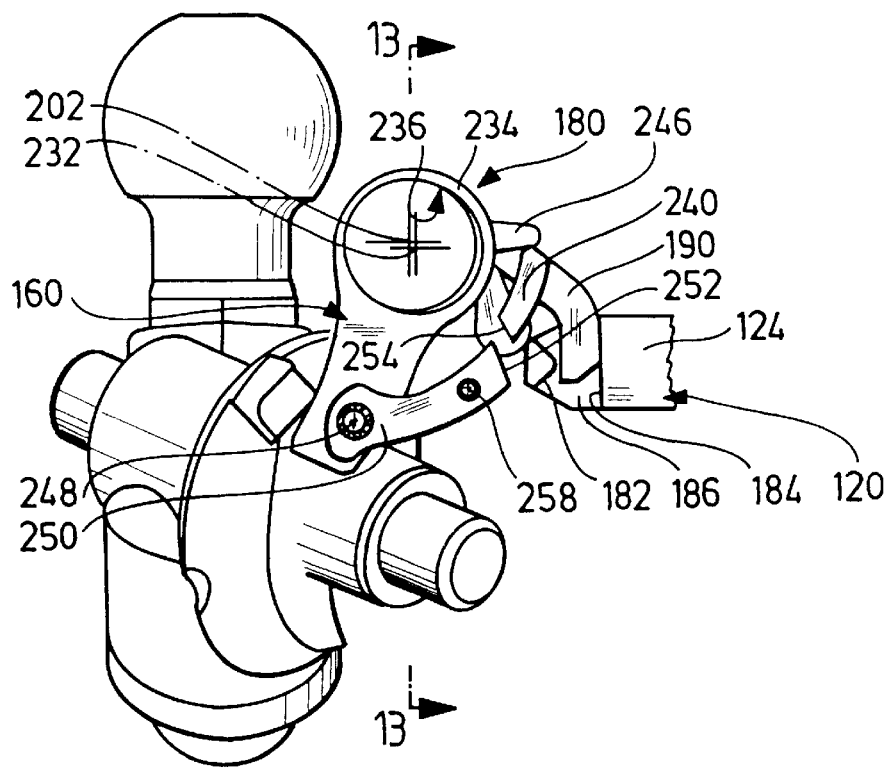
FIG. 12 shows a perspective illustration similar to FIG. 8 of the second example embodiment of the trailer coupling without the bearing part, but in the release position of the second supporting element.
Figure 13:
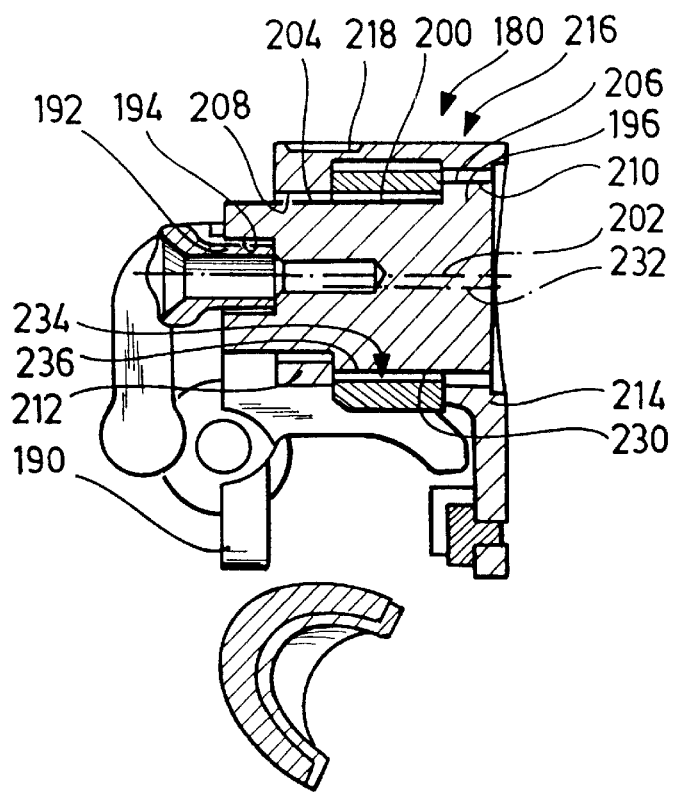
FIG. 13 shows a section along the line 13—13 in FIG. 12.

Furthermore, the supporting arm 160 is provided in the region of its bearing eye 234 with a lug 246 which projects in the radial direction with respect to the axis of rotation 202, so far that the entrainer arm 240 can come into abutment against it, entraining the supporting arm 160, as illustrated in FIG. 12, and as described in detail below.

An entraining lever 250 is articulated to the supporting arm 160 in a manner rotatable about an axis of rotation 248 extending at a spacing from the axis 232, the entraining lever 250 extending in the plane 244 and having an entrainer surface 252 which is able to co-operate with an end surface 254 on the end 242 of the entrainer arm 240, the entraining lever 250 additionally being controllable by a slot-type guide 256 provided on the bearing flange 214, in such a way that the entrainer surface 252 is in a position which may be brought into operative connection with the end surface 254 or a position out of operative connection. For this purpose, the entraining lever 250 is also provided with an entrainer 258, preferably in the form of an entraining pin, which engages in the slot-type guide 256. The entrainer 258 is in this connection provided close to the entrainer surface 252 in order to control the position of the entrainer surface 252 in the manner already mentioned by pivoting the entraining lever 250 about the pivot axis 248.

As already illustrated in FIGS. 8 and 9, in the locking position of the supporting arm 160 the latter abuts by means of its supporting surface 162 against the abutting surface 164 of the depression 166. Moreover, in the position shown in FIGS. 8 and 9, the supporting arm 160 is in its clamping position, so that the pivotal part 14' undergoes a moment such that the supporting surface 52 and the first abutting surface 54 abut in a manner tensioned against one another.

Figure 14:
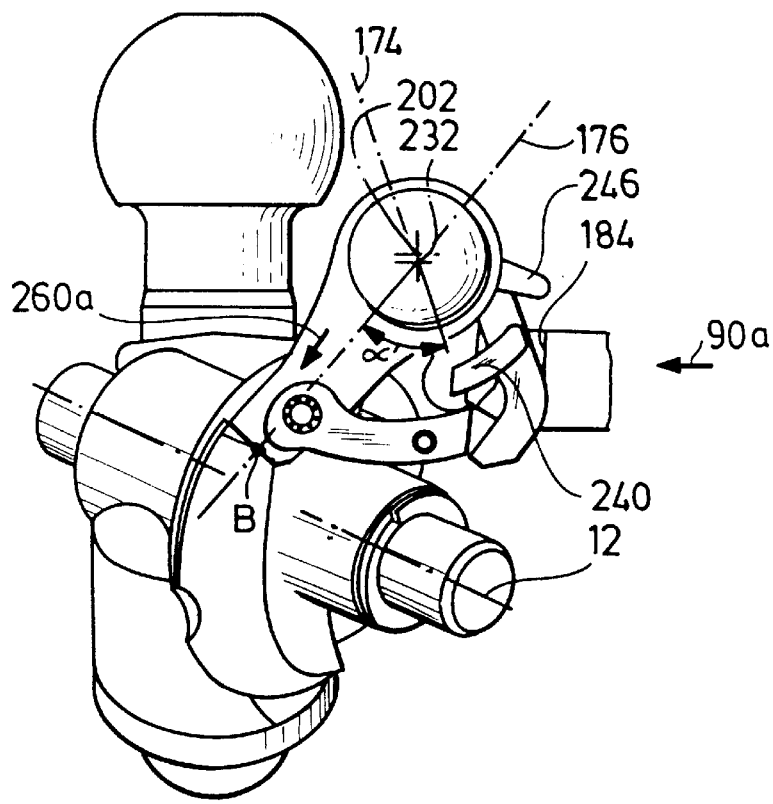
FIG. 14 shows an illustration similar to FIG. 12, with the second supporting element in the locking position and clamping position.

In this position, as illustrated in FIG. 14, the eccentric portion 200 is rotated so far that the axis 232 lies on a side of the axis of rotation of the eccentric shaft 196 facing the abutting surface 64', so that the whole supporting arm 160 is displaced in the direction of the abutting surface 64'.

During this, as illustrated in FIG. 14, a plane 174 extending through the axis 232 and the axis of rotation 202 forms an angle a with a plane 176 which extends on the one hand through the axis 232 and on the other hand through a point of contact B between the abutting surface 64' and the supporting surface 62'.

This means that the displacement of the supporting arm 160 in the direction of the abutting surface 64' does not take place over the maximum possible travel predetermined by the spacing between the axis of rotation 202 and the axis 232, but only over a part of this travel, as explained in detail below.

In this position of the supporting arm 160, the eccentric shaft 196 is acted upon by the driving lever 190 with a moment of rotation which arises from the fact that the clamping body 124 acted upon by the clamping spring 126 of the clamping force generating unit 120 acts on the driving lever 190 by the active surface 184 acting on the driving lever 190.

The supporting arm 160 would, however, remain in the position acting on the abutting surface 64' in any case, since the eccentric portion 200 is constructed such that because of the friction between the bearing surface 230 and the bearing eye surface 236 and the spacing between the axis of rotation 202 and the axis 232 there is an automatic locking of the eccentric to prevent rotation as a result of action on the supporting surface 62'.

Figure 15:
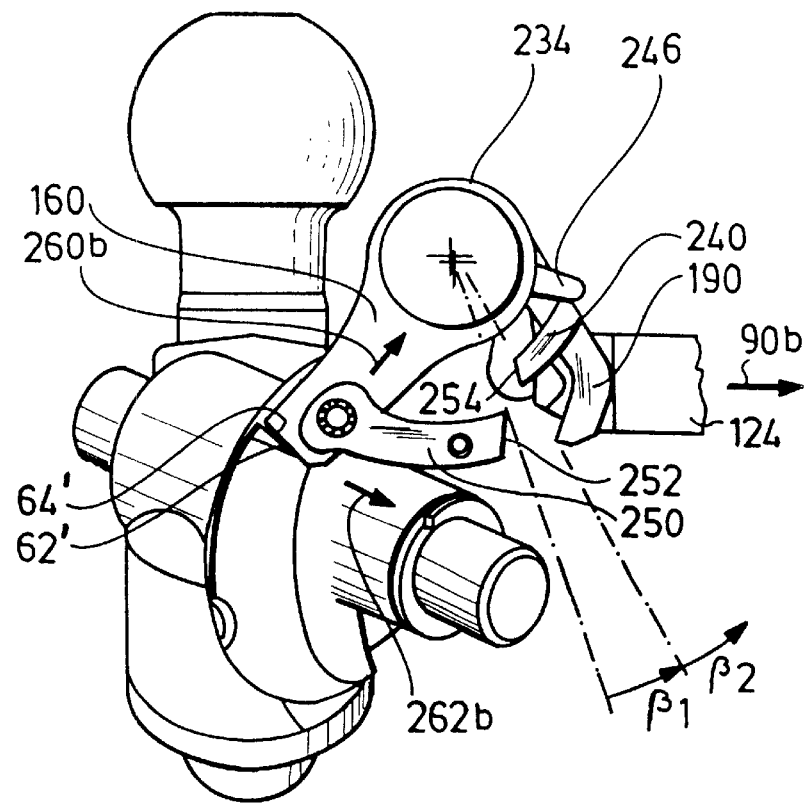
FIG. 15 shows a perspective illustration similar to FIG. 14 with the second supporting element in the free position, but still in the locking position.

If the cable pull 152 of the clamping force generating unit 120 is now pulled and the clamping body 124 moves in the free direction 90b, then as illustrated in FIG. 15 the driving lever 190 is rotated so far that the entrainer arm 240 comes into abutment against the lug 246. During this rotation of the driving lever 190, the eccentric portion 200 rotates only about an angle $\beta_1$ in relation to the plane 174, as a result of which there is a movement of the supporting arm 160 in a direction 260b away from the abutting surface 64' from the clamping position into the free position, so that the tensioning between the supporting surface 52 and the abutting surface 54 is removed. If the clamping body 124 is moved further in the direction 90b, then there is further pivoting of the eccentric portion 200 about a further angle $\beta_2$, so that the supporting arm 160 is moved even further in the direction 260b. At the same time, however, as a result of the entrainer arm 240 abutting against the lug 246, there is a simultaneous pivoting of the supporting arm 160 in a direction 262b from the locking position into the release position, the supporting surface 62' being moved out of the depression 66' and thus also moving away from the abutting surface 64' and thus releasing a pivotal movement of the ball neck 16 about the pivot axis 12. Even with a small pivoting of the pivotal part 14' with the ball neck 16 about the pivot axis 12, the pivotal part 14' is rotated with the comb 168 so far in relation to the supporting arm 160 that the supporting surface 62' can no longer be moved into the depression 66'. Once this is the case, the tensile action on the clamping body 124 by the cable pull 152 can already be dispensed with and the clamping body 124, acted upon by the clamping spring 126, can act on the driving lever 190 again.

The driving lever 190 is however blocked in its pivotal movement in the direction 262a in that the entrainer arm 240 abuts by means of the end surface 254 against the entrainer surface 252 of the entraining lever 250 (FIG. 16), which is pivoted by the slot-type guide 256 so far that the entrainer surface 252 may be acted upon by the end surface 254. For this purpose, the slot-type guide 256, as illustrated in FIG. 8, has a portion 256a which pivots the entraining lever 250 in the direction of the axis of rotation 202 and thus brings it into the operative position, for example raises it.

Furthermore, the supporting arm 160 is blocked to prevent pivoting in the direction 262a, that is to say in the direction of the locking position, since the supporting arm abuts against a side surface 170 of the comb 168 and slides along this surface when the pivotal part rotates. During this, the ball neck 16 is for example pivotal from the operative position into a rest position.

Figure 17:
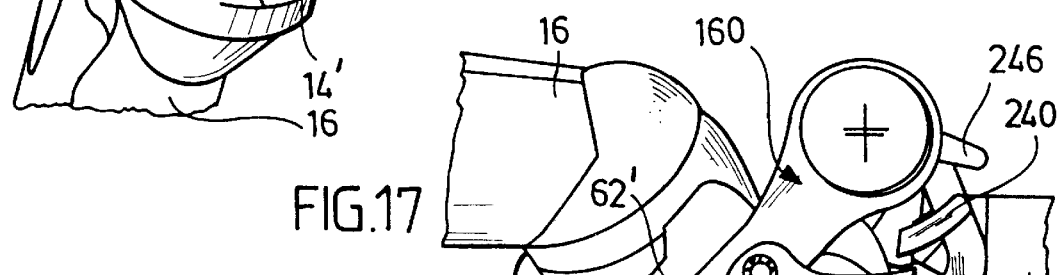
FIG. 17 shows an illustration similar to FIG. 16, with the ball neck in the rest position and the supporting element in a corresponding position.

In the rest position of the ball neck 16 illustrated in FIG. 17, the pivotal part 14' is pivoted so far about the axis 12 that the supporting arm 160 can pivot by means of its front end bearing the supporting surface 62' into a cutout 264 in which, however, the supporting surface 62' is not operative. In order to fix the pivotal part 141 in the rest position of the ball neck 16, the comb 168 is provided with a further cutout 270 with which, in the rest position of the ball neck 16, a fixing lever 272 comes into engagement by means of a spherically constructed front end 274. The fixing lever 272 is in this connection rigidly connected to the driving lever 190 and can engage in the cutout 270 when the supporting arm 160 is pivoted into the cutout 264.

The pivoting of the end of the supporting arm 160 carrying the supporting surface 62' into the cutout 264 serves merely to allow the driving lever 190 to pivot in the direction 262a about an angle such that the fixing lever 272 can engage in the cutout 270 by means of the spherical end 274.

In the rest position of the ball neck 16, there is therefore only a fixing thereof to prevent pivoting about the pivot axis 12 because the fixing lever 272 engages in the cutout 270 by means of the end 274, without an additional tensioning against additional supporting and abutting surfaces being provided.

Figure 16:
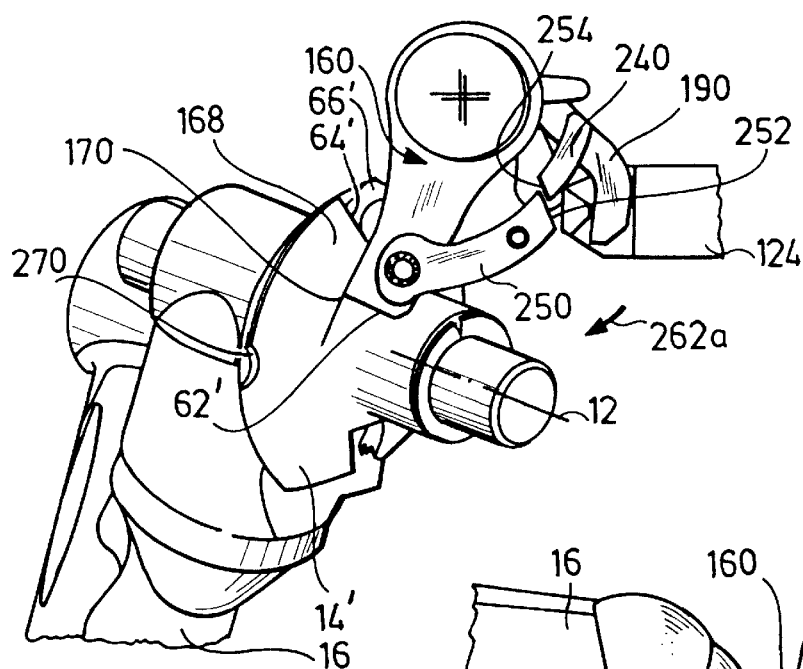
FIG. 16 shows a view similar to FIG. 15 after the operative position of the ball neck has been left, with the second supporting element acted upon by the clamping force generating unit.

The pivotal movement of the pivotal part 14' in the rest position of the ball neck 16 is in turn released by pulling on the cable pull 152 and thus moving the clamping body 124 in the direction 92b, so that once again as a result of co-operation between the entrainer arm 240 and the lug 246 there is a pivoting of the supporting arm 160 and also of the fixing lever 272 into the release position, and further pivoting of the pivotal part 14 out of the rest position again results in the supporting arm 160 again abutting against the side surface 170 of the comb 168 and thus allowing braked pivoting of the pivotal part 14' about the pivot axis 12 in the direction of the operative position, so that the same position of the pivotal arm 160 already shown in FIG. 16 can be achieved, the clamping body 124, acted upon by the force of the clamping spring 126, at all times acting on the driving lever 190 and by way of the entrainer arm 240, the end surface 254, the entrainer surface 252 and the entraining lever 250 converting the clamping force of the clamping spring 126 into a force which acts in the direction 262a on the end of the supporting arm 160 bearing the supporting surface 62' and by means of which the latter acts in opposition to the side surface 170.

Figure 18:
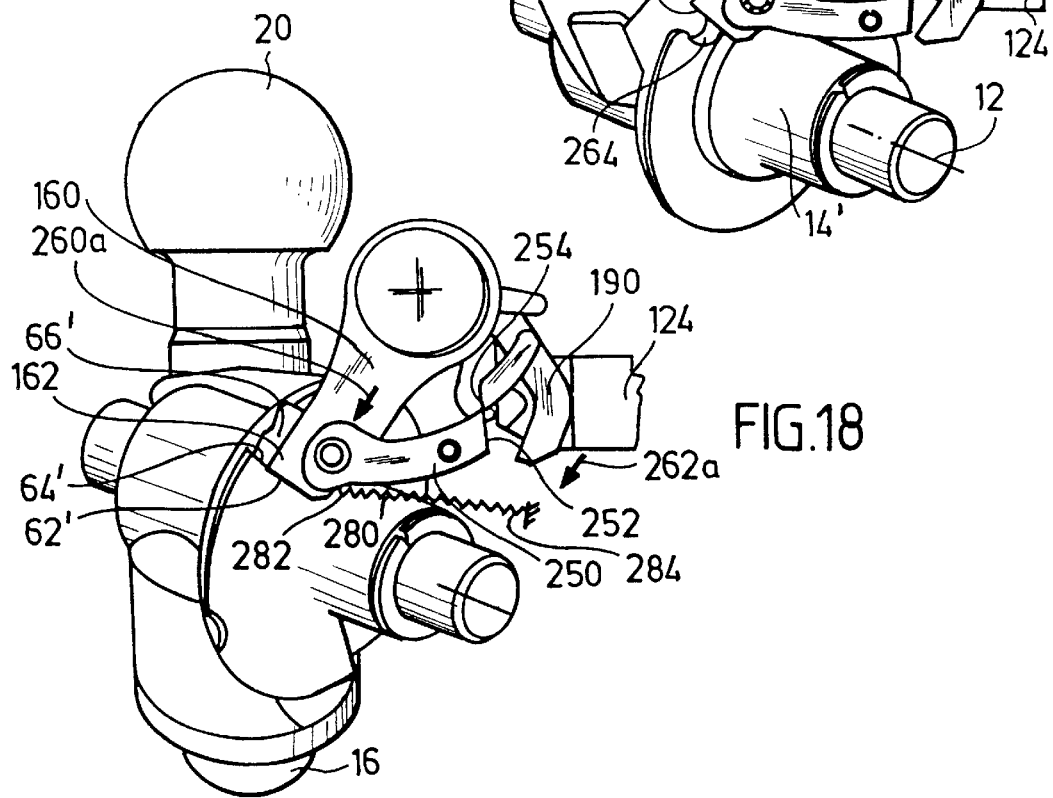
FIG. 18 shows a perspective illustration similar to FIG. 14, as the second supporting element moves in the direction of the locking position, but directly before reaching the latter and with the second supporting element still in the free position.

As soon as the ball neck 16 has reached the operative position, as illustrated in FIG. 18, the supporting arm 160 pivots by means of the end bearing the supporting surface 62' into the depression 66' and thus moves from the release position to the locking position, so that the supporting surface 62' in turn comes into partial congruence with the abutting surface 64'. As soon as the supporting arm 160 has in turn pivoted completely into the depression 66 and the supporting surface 62' faces the abutting surface 64', the slot-type guide 256 pivots the entraining lever 250 by means of a portion 256b of the slot-type guide 256 which brings it out of the active position, for example lowers it, so far that the end surface 254 slides away from the entrainer surface 252 of the entraining lever 250 and now the driving lever 190 is pivoted further in the direction 262a without pivoting further the supporting arm 160, which is already in the depression 66'. However, during this the eccentric portion 200 pivots such that the supporting arm 160 is displaced in the direction 260a from the release position into the clamping position, so that the supporting surface 62' acts with pressure on the abutting surface 64' and at the same time additionally the abutting surface 54 abuts against the supporting surface 52 with pre-tension and also without play.

To help reach the locking position, the end 162 of the supporting arm 160 bearing the supporting surfaces 62', as illustrated in FIG. 18, is acted upon by a pressure spring 280 which at one end 282 acts on the end 162 of the supporting arm 160 and with another end 284 is supported against the bearing part 10, preferably against the bearing flange 36. As a result of this pressure spring 280, even when the end surface 254 no longer acts on the entrainer surface 252, pivoting of the supporting arm into the locking position is completed and the locking position is maintained until a transfer from the free position into the clamping position is fully performed.

Furthermore, even if the clamping force generating unit 120 is actuated, the locking position is maintained by the pressure spring 280 until the supporting arm 160 is entrained by the co-operation of the lug 246 and the entrainer arm 240.

What is claimed is:

1. A trailer coupling for motor vehicles, comprising:
   a bearing part adapted to be fixed to a vehicle;
   a pivotal part mounted on the bearing part and having a ball neck and a coupling ball, the pivotal part being pivotal, in relation to the bearing part, about an axis between a rest position and an operative position;
   said pivotal part having first and second abutting elements spaced from one another; and
   said bearing part being provided with first and second supporting elements;
   wherein:
      to fix the ball neck in said operative position against pivotal movement about said axis, the first supporting element and the first abutting element cooperate such that the ball neck undergoes a pivotal movement in a first direction which is countered by the second supporting element and the second abutting element, whereby the abutting elements and the supporting elements are able to abut against one another without play.

2. A trailer coupling according to claim 1, wherein, to fix the ball neck in the operative position, the abutting elements and the supporting elements are tensionable against one another in a clamping position.

3. A trailer coupling according to claim 2, wherein, in the clamping position, at least one element of a pair comprising one of the supporting elements and one of the abutting elements acts on the other element in the direction in which the clamping force acts, in such a way as to provide an adjustment.

4. A trailer coupling according to claim 2, wherein in the clamping position a resilient clamping force energy store acts on one of the elements.

5. A trailer coupling according to claim 3, wherein one of the elements in the clamping position is mounted movably in a clamping direction.

6. A trailer coupling according to claim 1, wherein when the pivotal part is pivoted about the axis, each of the abutting elements rotates about the pivot axis on a radially spaced path.

7. A trailer coupling according to claim 6, wherein the abutting elements are movable such that they rotate about the pivot axis on different paths.

8. A trailer coupling according to claim 1, wherein a first one of the abutting elements is constructed as an element arranged fixed to the pivotal part.

9. A trailer coupling according to claim 8, wherein a second of the abutting elements is constructed as an element arranged fixed to the pivotal part.

10. A trailer coupling according to claim 1, wherein one of the abutting elements is arranged on a comb of the pivotal part.

11. A trailer coupling according to claim 1, wherein another of the abutting elements is arranged on a lug of the ball neck, said lug adjoining the pivotal part.

12. A trailer coupling according to claim 1, wherein a first one of the supporting elements is arranged in a region of the bearing part which is at the rear, as seen in the direction of travel.

13. A trailer coupling according to claim 12, wherein a second of the supporting elements is arranged in a region of the bearing part which is at the front, as seen in the direction of travel.

14. A trailer coupling according to claim 1, wherein one of the supporting elements is arranged on the bearing part as a supporting element which at all times projects into the path of the corresponding abutting element.

15. A trailer coupling according to claim 14, wherein another of the supporting elements is arranged on the bearing part as a supporting element which is movable from a release position into the path of the other abutting element as far as a locking position, and vice versa.

16. A trailer coupling according to claim 15, wherein the movable supporting element is movable into the path of the corresponding abutting element as a result of a linear displacement.

17. A trailer coupling according to claim 15, wherein the movable supporting element is capable of being pivoted into the path of the corresponding abutting element.

18. A trailer coupling according to claim 15, wherein an actuating means is provided to move the supporting element between the release position and the locking position.

19. A trailer coupling according to claim 18, wherein the actuating means comprises an adjusting wedge acting on the supporting element guided in a guide.

20. A trailer coupling according to claim 18, wherein the actuating means comprises a pivot bearing and a pivot drive for the supporting element.

21. A trailer coupling according to claim 1, wherein a tensioning gear is provided to tension the abutting elements and the supporting elements against one another, by means of which tensioning gear at least one of the supporting elements or at least one of the abutting elements is movable out of a free position into a clamping position and vice versa.

22. A trailer coupling according to claim 21, wherein the tensioning gear is automatically locking.

23. A trailer coupling according to claim 21, wherein the tensioning gear comprises a wedge gear.

24. A trailer coupling according to claim 23, wherein the wedge gear is a displacement wedge gear.

25. A trailer coupling according to claim 21, wherein the tensioning gear comprises an eccentric gear.

26. A trailer coupling according to claim 21, wherein a clamping wedge of the tensioning gear cooperates with the supporting element.

27. A trailer coupling according to claim 26, wherein an eccentric portion of the tensioning gear cooperates with the supporting element.

28. A trailer coupling according to claim 21, wherein one of the supporting elements is movable by the tensioning gear in the direction of the corresponding abutting element.

29. A trailer coupling according to claim 21, wherein:

an actuating means is provided to move a movable supporting element between a release position and a locking position; and the actuating means includes the tensioning gear.

30. A trailer coupling according to claim 29, wherein in order to fix the ball neck in the operative position, the actuating means moves the movable supporting element from the release position into the locking position, and also when the locking position has been reached transfers the tensioning gear from the free position into the clamping position and, in order to release the ball neck, transfers the tensioning gear from the clamping position into the free position and then moves the supporting element from the locking position into the release position.

31. A trailer coupling according to claim 30, wherein the actuating means forcibly moves the movable supporting element from the release position into the locking position.

32. A trailer coupling according to claim 31, wherein the actuating means forcibly moves the movable supporting element from the locking position into the release position.

33. A trailer coupling according to claim 31, wherein the actuating means forcibly moves the movable supporting element from the free position into the clamping position.

34. A trailer coupling according to claim 33, wherein the actuating means forcibly moves the movable supporting element from the clamping position into the free position.

35. A trailer coupling according to claim 30, wherein the actuating means has a single drive element on actuation of which the movable supporting element can be brought into any of the positions comprising the release position, the locking position, the free position and the clamping position.

36. A trailer coupling according to claim 35, wherein the actuating means has two wedge elements which can successively be brought into a position acting on the supporting element.

37. A trailer coupling according to claim 35, wherein the actuating means has a ratchet mechanism by means of which it is possible to couple the actuation of the tensioning gear to the pivotal movement of the supporting element between the release position and the locking position.

38. A trailer coupling according to claim 18, wherein the actuating means operates with a clamping force generating unit which acts on the actuating means with a force in such a manner that it is actuated in the direction of the locking position of the supporting element and the locking position of the tensioning gear.

39. A trailer coupling according to claim 38, wherein the clamping force generating unit has a force energy store which acts on a clamping body in such a manner that the actuating means is actuated to reach the locking position and clamping position.

40. A trailer coupling according to claim 39, wherein the clamping force generating unit has a blocking device which, when the clamping force generating unit is not actuated, blocks a movement of the clamping body out of the locking position in the direction of the release position.

41. A trailer coupling according to claim 40, wherein the blocking device can be freed when the clamping force generating unit is actuated in order to reach the release position.

42. A trailer coupling according to claim 40, wherein the clamping force generating unit has an operating element by means of which first the blocking device can be freed such that an unlatching force can then act on the actuating means.

43. A trailer coupling according to claim 18, wherein the actuating means and the movable supporting element are grouped together to form a module.

44. A trailer coupling according to claim 43, wherein the module is adjustable with respect to the bearing part.

* * * * *